(12) United States Patent
Dudar

(10) Patent No.: US 12,202,310 B2
(45) Date of Patent: Jan. 21, 2025

(54) SYSTEMS AND METHODS FOR CALIBRATING ONBOARD WEIGHT SENSORS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 17/659,861

(22) Filed: Apr. 20, 2022

(65) Prior Publication Data

US 2023/0339280 A1 Oct. 26, 2023

(51) Int. Cl.

| B60G 17/08 | (2006.01) |
|---|---|
| B60G 17/017 | (2006.01) |
| B60G 17/019 | (2006.01) |
| B60W 60/00 | (2020.01) |
| G01G 19/12 | (2006.01) |

(Continued)

(52) U.S. Cl.
CPC ..... *B60G 17/01908* (2013.01); *B60G 17/017* (2013.01); *B60W 60/0025* (2020.02); *G01G 19/12* (2013.01); *G06V 10/56* (2022.01); *G06V 10/74* (2022.01); *G06V 20/56* (2022.01); *B60G 2400/0511* (2013.01); *B60G 2400/0512* (2013.01); *B60G 2400/0513* (2013.01); *B60G 2500/30* (2013.01); *B60W 2420/403* (2013.01);

(Continued)

(58) Field of Classification Search
CPC ............ B60G 17/01908; B60G 17/017; B60G 2400/0511; B60G 2400/0512; B60G 2400/0513; B60G 2500/30; B60W 60/0025; B60W 2420/403; B60W 2530/10; B60W 2710/22; G06V 10/56; G06V 10/74; G06V 20/56; G01G 19/12
See application file for complete search history.

(56) References Cited

U.S. PATENT DOCUMENTS 10,331,969 B2 * 6/2019 Charpentier ......... G06Q 20/208
11,402,224 B2 * 8/2022 Chase .................. G05D 1/0297
(Continued)

FOREIGN PATENT DOCUMENTS

| CN | 101763640 A | 6/2010 |
|---|---|---|
| CN | 103182916 A * | 7/2013 |

(Continued)

OTHER PUBLICATIONS

English translation of JP H1183606 A (Year: 1999).*
(Continued)

*Primary Examiner* — Navid Z. Mehdizadeh
*Assistant Examiner* — Matthew Ho
(74) *Attorney, Agent, or Firm* — Emily Drake; Eversheds Sutherland (US) LLP

(57) ABSTRACT

Theft deterrent systems and methods using onboard weight sensors are disclosed herein. An example method can include obtaining an image of a location where a scale is located in a vehicle, the scale being used for cargo weight measurement, determining from the image, when the location of the scale is located is empty, determining a weight value output by the scale, determining an offset for the scale when the weight value is greater than a weight threshold, and adjusting the scale using the offset to zero the scale.

14 Claims, 5 Drawing Sheets

(51) Int. Cl.
*G06V 10/56* (2022.01)
*G06V 10/74* (2022.01)
*G06V 20/56* (2022.01)

(52) U.S. Cl.
CPC ..... *B60W 2530/10* (2013.01); *B60W 2710/22* (2013.01)

(56) References Cited

U.S. PATENT DOCUMENTS

| | | | |
|---|---|---|---|
| 2005/0199782 A1* | 9/2005 | Calver | G01S 17/04 250/208.1 |
| 2006/0267296 A1* | 11/2006 | Dodd | B60G 17/01908 280/124.157 |
| 2021/0231460 A1* | 7/2021 | Uno | G06T 7/254 |
| 2022/0073030 A1* | 3/2022 | Han | B60R 25/1004 |
| 2023/0306625 A1* | 9/2023 | Peruch | G06K 7/1413 |

FOREIGN PATENT DOCUMENTS

| | | | | |
|---|---|---|---|---|
| CN | 109087526 A | * | 12/2018 | |
| CN | 110853004 A | | 2/2020 | |
| DE | 102017009146 A1 | * | 4/2018 | ........... B60G 17/019 |
| JP | H02176504 A | | 7/1990 | |
| JP | H1183606 A | * | 3/1999 | |
| JP | 2004132733 A | * | 4/2004 | |
| KR | 100666234 B1 | | 1/2007 | |
| KR | 20090122577 A | * | 12/2009 | |
| KR | 101308925 B1 | * | 9/2013 | |

OTHER PUBLICATIONS

English translation of JP-2004132733-A (Year: 2004).*
English translation of KR 101308925 B1 (Year: 2013).*
English translation of CN-103182916-A (Year: 2013).*
English translation of CN-109087526-A (Year: 2018).*
English translation of DE-102017009146-A1 (Year: 2018).*
English translation of KR 20090122577 A (Year: 2009).*
Ye Xia, et al., Infrastructure Safety Oriented Traffice Load Monitoring Using Multi-Sensor and Single Camera for Short and Medium Span Bridges, MDPI, Remote Sensing, DOI:10.3390, 11, 2019, 1-21.

* cited by examiner

SYSTEMS AND METHODS FOR CALIBRATING ONBOARD WEIGHT SENSORS

BACKGROUND

Some vehicles, such as pickup trucks have introduced onboard scales. The scales can be used to measure the weight of the cargo. Users can weigh cargo and/or trailer weight to ensure that any applicable weight limit is not exceeded. As the scales have mechanical parts, these parts may wear over time and overreport or underreport the true weight in the cargo area of the vehicle where the scale is located. For example, the scales may develop an offset even with zero weight in the cargo area. The scales may overly report the weight of objects in the cargo which appears to decrease the available payload of the truck leading to customer dissatisfaction. While a customer may be able to manually zero a scale, this is prone to human errors if cargo items are forgotten in it or truck is parked onto soft terrain, inclined surface, which is not friendly to zeroing a scale.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
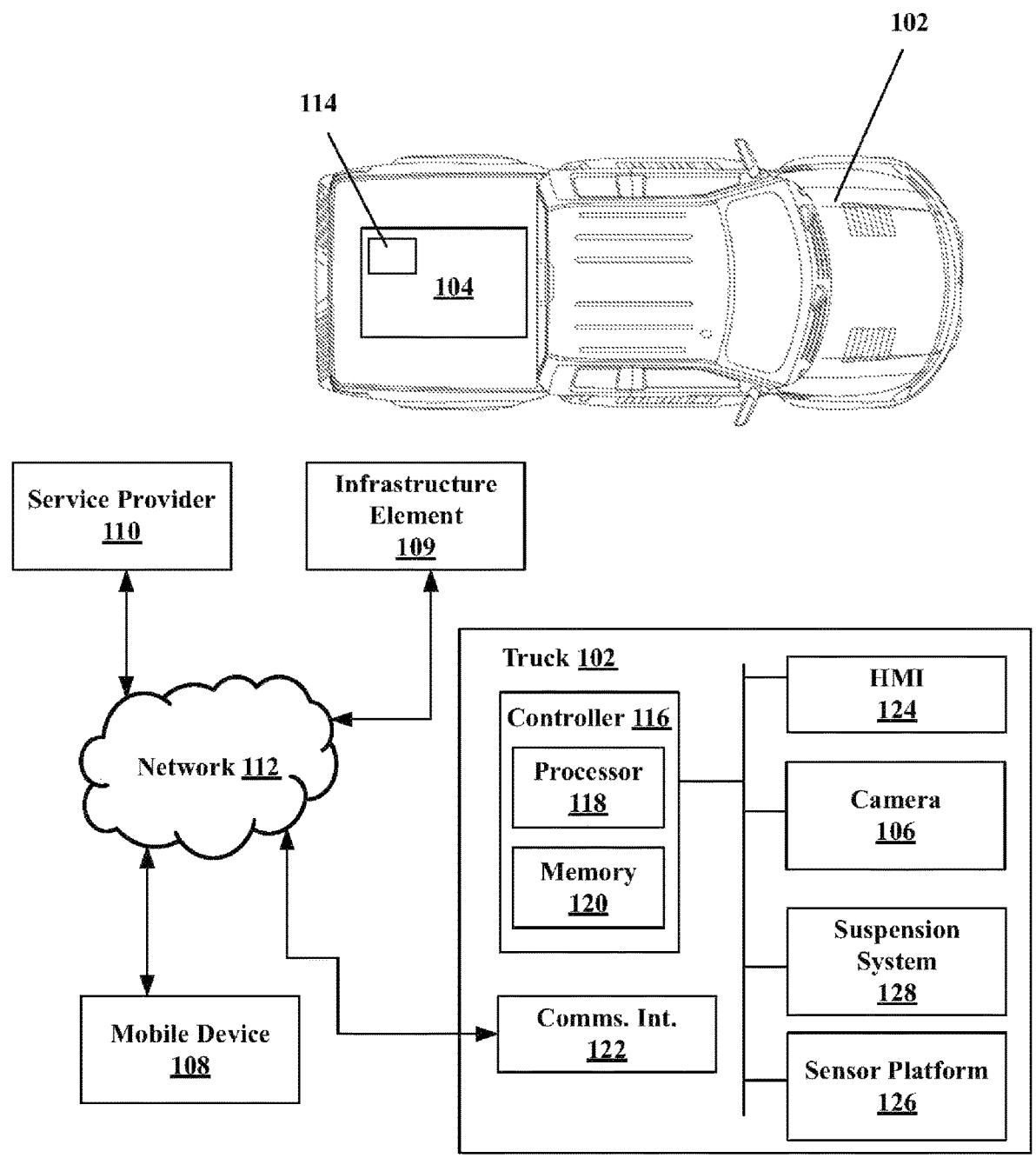
FIG. 1 illustrates an example environment where aspects of the present disclosure may be practiced.

Disclosed are systems and methods for intelligent onboard scale calibration in vehicles. Some example implementations may use offset correction for calibrating truck onboard weight scales. Some trucks are equipped with a cargo camera to monitor the cargo items. An example method uses a cargo camera as a surrogate sensor when diagnosing the accuracy of onboard scales, and assist in reporting weight when the cargo bed is empty, referred to as an offset. As scales perform best on solid and flat surfaces, some methods use onboard sensors to ensure that this condition is met.

An onboard scales diagnostic may use entry conditions. A first condition may include performing the diagnostic during daylight hours and the weather is clear. A second condition may include that the cargo camera is not in direct sunlight. A third condition may include that the truck is parked on a flat and solid surface (for example, yaw, roll, pitch may indicate a truck parked flatly to proceed). A rear camera may be used to infer the surface by imaging the surface, or a surface type may be inferred from a three-dimensional cloud map. A stored baseline image of an empty cargo bed may also be taken by the cargo camera. Vehicle idle state (not moving, preferably engine off). If the truck is equipped with an active suspension system, it may raise/lower/tilt the suspension to level itself. If self-leveling is not possible due to severe angles, the truck may dispatch itself to a parking location that is a flat and solid surface. This location can be learned or obtained from a three-dimensional (3D) cloud map.

In some instances, an offset analysis and calibration event can occur after the key-off event. A cargo camera can be controlled to snap a series of photos of the cargo bed. An informative/preparatory step can be executed to encourage a user to empty the bed. For example, before diagnostic execution, a message may flash onto a human-machine interface (HMI) informing the user to empty the truck bed of belongings as a recalibration of the onboard scales is about to occur.

A controller can instruct the onboard camera to obtain an image (or images) of the truck bed. These images can be used to determine if an object is present. If a cargo camera is not present, then an infrastructure camera such as a home security camera or drone-mounted camera may also be used to capture the image(s). Using both captured images and a baseline image of the truck bed without an object, the controller can execute object imaging and processing methods such as image subtraction and pixel contrast analysis.

With a confirmed empty truck bed, the onboard scale value is recorded. If the value is less than a threshold (for example, 5-10 pounds), the controller can adopt this as a new offset for zeroing the scale when making future weight calculations. For any new scale weight, the controller can subtract 5-10 pounds from the reading. If the value is grossly off zero (>10 pounds), a DTC may be set to indicate that the onboard scale is inaccurate and needs servicing.

Autonomous vehicle platforms may also include scales and thus there may not be a human to perform manual calibration steps. Road "pitch" and "bank" can be calculated from raw signals. In some instances, a powertrain control module (PCM) receives these signals through controller area network (CAN) messages. Leveling a vehicle can occur before obtaining an accurate scale reading. By utilizing the cargo camera to identify a true empty and dry bed, the zeroing of the scale is also ensured to be free of loads.

Illustrative Embodiments

Turning now to the drawings, FIG. 1 depicts an illustrative architecture 100 in which techniques and structures of the present disclosure may be implemented. The architecture 100 includes a truck 102, a scale 104, a camera 106, a mobile device 108, an infrastructure element 109, a service provider 110, and a network 112. The network 112 can include combinations of networks. For example, the network 112 may include any one or a combination of multiple different types of networks, such as cellular, cable, the Internet, wireless networks, and other private and/or public networks. The network 112 can include either or both short and long-range wireless networks.

It will be understood that while descriptions herein may reference the use of a scale in a bed of the truck 102 as an example, weight scales can be incorporated into any type of vehicle and in any desired location. For example, a scale may be incorporated into a trunk of a car. A scale may also be incorporated into a dedicated package location in a delivery vehicle. Thus, the descriptions involving a truck are non-limiting and merely for explanatory purposes.

The truck can receive an object 114 or item in the bed of the truck where the scale 104 is located. The scale 104 can be used to obtain a weight measurement of the object 114. As noted above, due to various reasons, the scale 104 may register inaccurate readings. For example, when no objects or items are in the truck bed, the scale 104 may inaccurately output a value other than zero. A zero value is expected when no load is applied to the scale 104. The value output by the scale 104 when not under a load is referred to herein as an offset. For example, the scale 104 might output a measured value of five pounds when nothing is on the scale 104.

In order to adjust for this offset and ensure that scale measurements are reported accurately, the scale 104 can be recalibrated using a controller 116. The controller 116 can comprise a processor 118 and memory 120. The processor 118 executes instructions stored in memory 120 to perform any of the methods disclosed herein. When referring to actions performed by the controller 116, it will be understood that this includes execution of instructions by the processor 118. The truck 102 can also comprise a communications interface 122 that allows the controller 116 to access the network 112. In some instances, the truck 102 also comprises a human-machine interface 124 that can be used to present messages to a user. For example, prior to a calibration process, the controller 116 can output a message on the HMI 124 to instruct the user to ensure that the bed of the truck is empty.

The truck 102 can comprise a sensor platform 126. The sensor platform 126 can be connected to the controller and provide CAN messages from various sensors such as degree of freedom sensors. Example sensors include but are not limited to, gyroscopes, accelerometers, and so forth. These sensors can measure values such as longitude, latitude, vertical position, yaw, roll, and so forth. Output from the sensor platform 126 can be used to determine pitch, yaw, roll, bank, or other values that indicate if the truck 102 is sitting on a flat or angled surface.

In some instances, the controller 116 can be configured to calibrate the scale 104 periodically, according to a schedule. The scale 104 can be calibrated by a user on an ad-hoc basis as well. Prior to a calibration event, the controller 116 can be configured to determine one or more conditions.

The controller 116 can be configured to obtain data over the network 112 that indicates whether the calibration process is being conducted during daylight hours or whether inclement weather conditions may exist. To be sure, rain, snow, or other inclement weather may affect scale readings due to weight added to the scale by such weather. Also, in order to use camera images to validate that the bed of the truck is empty, the controller 116 may ensure that the calibration process is being conducted during daylight hours.

The controller 116 can also use images from the camera 106 to ensure that the camera 106 is not pointed in direct sunlight, as this would affect the quality of the images obtained by the camera. The user can be instructed to reorient the vehicle if the Sun is shining directly into the camera 106.

Once these environmental conditions are accounted for by the controller 116, the controller 116 can determine if the truck is level, by virtue of being located on a flat surface. The controller 116 can use the CAN signals from the sensor platform 126, as noted above, to determine if the truck is level. In some instances, the controller 116 can infer that the truck is likely on a flat surface when GPS signals indicate that the truck 102 is in a parking lot. In some instances, the GPS signals can be used to verify a surface type of a surface that the vehicle is located on. Thus, while camera images can be used to detect a surface type, GPS signals can be used to confirm the surface type.

Conversely, when the GPS signals indicate that the truck 102 is off-road, the controller 116 may infer that the truck 102 is located on a surface that may not be level. When equipped with a tailgate or rear camera, the controller 116 can use images obtained from this camera to infer a contour of the surface by imaging the surface, or surface type may be inferred from a 3D cloud map.

When the controller 116 determines that the truck is not level, the controller 116 can cause a suspension system 128 to adjust to ensure that the truck 102 is level. For example, if the truck 102 is determined to be tilted from front to back, the controller 116 may control the suspension system 128 to raise a rear suspension of the vehicle or lower the front suspension until a level condition is achieved.

If adjustments to vehicle level have been attempted, but the vehicle cannot be leveled, the controller 116 can output a message to the HMI 124 that instructs a driver to find a flatter location to park. In some instances, the controller 116 can cause the truck to autonomously navigate to a location where a parking surface is likely flat, such as a parking lot. In sum, the controller 116 can determine that the truck cannot be leveled using the suspension system, and in response, autonomously navigate the truck to a different parking location where a surface that the truck is located on is level or likely to be level.

In some instances, prior to performing a calibration of the scale 104, the controller 116 can be configured to determine that a key-off event has occurred. For example, the controller 116 can be configured to obtain signals from an ignition module of the truck that indicates whether the vehicle is on or off.

The controller 116 can be configured to determine when the bed of the truck 102 is empty from images obtained by the camera 106. Generally, the controller 116 can obtain an image or images of a location where the scale is located in the truck. When the camera 16 is unavailable (some vehicles do not have onboard cameras), the images could be obtained by the mobile device 108, which could include a Smartphone or drone, or an infrastructure element 109 such as a home security camera.

In some instances, the controller 116 can also obtain a baseline image of the bed of the truck in an empty state. This image can be stored in the memory used by the controller 116, which was programmed during vehicle manufacturing. The controller 116 can also obtain this baseline image over the network.

The controller 116 can determine from the image when the location of the scale is located is empty. In more detail, this can include using both obtained image(s) and the baseline image. The controller 116 can be configured to use object imaging and processing methods such as image subtraction and pixel contrast analysis to determine if an object is in the bed of the truck or if it is empty.

The controller 116 can assign image pixels a grayscale value of one to five, with light pixels being one and darkest pixels being five. The pixels are summed together to produce an image density parameter. Similarly, pixels of the baseline image of an empty bed that is stored in memory or at the service provider 110 are also summed. Thus, an image density parameter is calculated for both the obtained image(s) and the baseline image.

The controller 116 can subtract the image density parameters to identify if there are discrepancies therebetween. If the subtraction values are above a threshold, then an object is determined to be present in the bed. In this case, the calibration diagnostic can abort. The user can be instructed to remove any items in the bed.

Conversely, if the image subtraction is near zero, then the obtained image(s) are determined to be similar to the baseline image stored in memory. This is an indication that the bed is empty.

When the bed is determined to be empty, the controller 116 can be configured to determine a weight value output by the scale 104. That is, the controller 116 can obtain a value output by the scale 104. The controller can learn the offset for the scale when the weight value is greater than a weight threshold. For example, if the weight value (output of scale) is greater than or equal to five pounds (example threshold value), the offset is stored by the controller 116. In some instances, when the offset value exceeds the threshold value by a certain amount, the controller 116 can output a message to the driver that the scale 104 should be repaired.

If an offset is determined, the controller 116 can then adjust the scale 104 using the offset to zero the scale output. Thus, when an object is placed into the bed and the user desires to obtain a scale reading, the controller 116 obtains the weight value and then applies the offset to obtain an accurate weight measurement.

Figure 2:
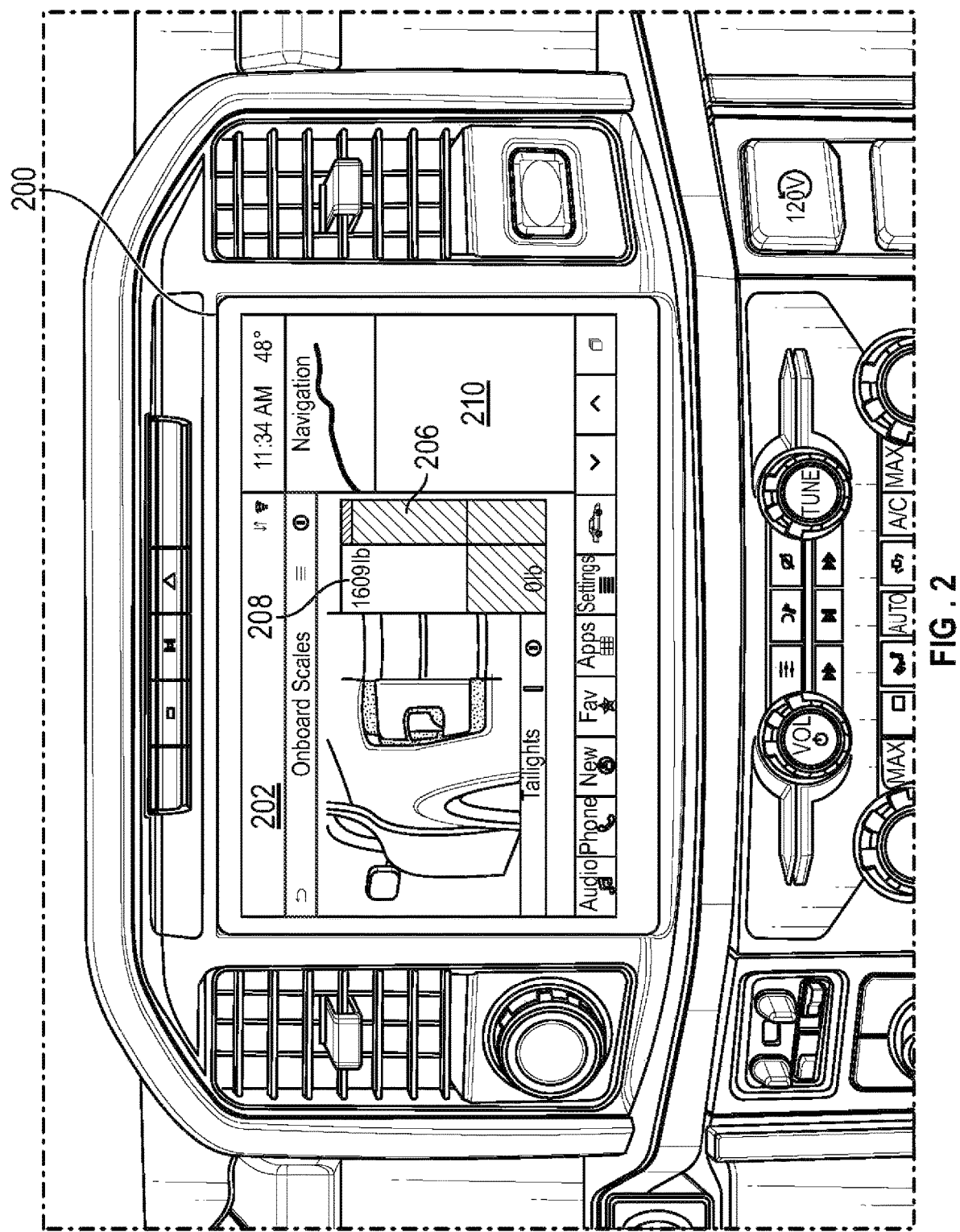
FIG. 2 illustrates an example human-machine interface that includes a user interface of the loading of an onboard scale.
Figure 3:
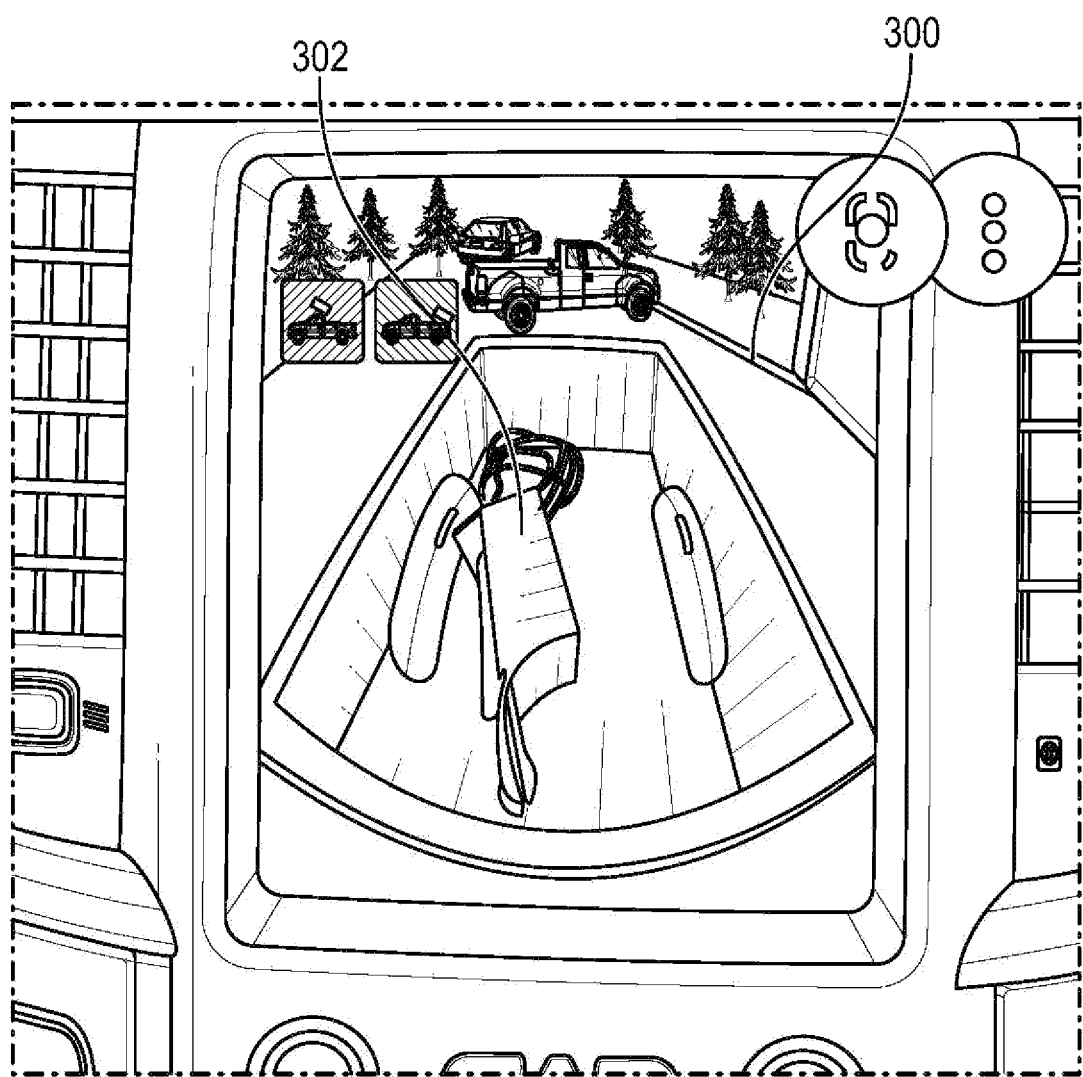
FIG. 3 illustrates an example image of an object (or set of objects) located inside the bed of a truck.

FIG. 2 illustrates an example HMI 200 that includes a user interface 202 of the loading of an onboard scale. The loading can indicate where objects are placed in the bed of the truck. That is, the sensing capability of the scale covers the area of the bed. In this example, an area 206 is loaded with an object having a measured amount of weight that is displayed as a value 208 on the user interface 202. A message 210 can be displayed to the user that instructs the user to remove any objects from the bed prior to calibration. FIG. 3 illustrates an example image 300 of an object 302 (or set of objects) located inside the bed of a truck. Again, this image can be obtained from an onboard camera, a drone, a mobile phone, and/or any other camera.

Figure 4:
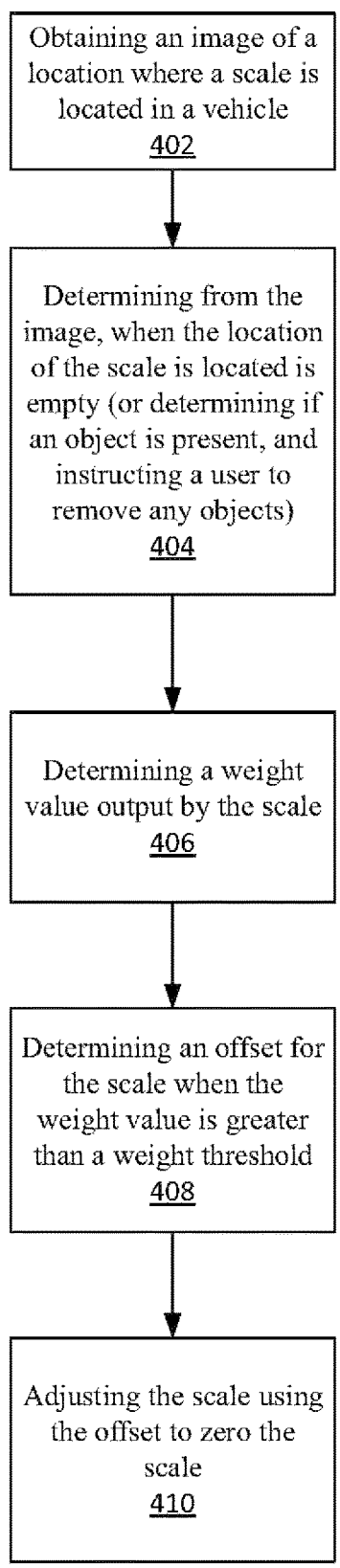
FIG. 4 is a flowchart of an example method of the present disclosure.

FIG. 4 is a flowchart of an example method of the present disclosure. The method can include a step 402 of obtaining an image of a location where a scale is located in a vehicle. Again, the scale is used for cargo weight measurement for the truck. The image can be obtained from any suitable camera that can include an onboard or off-board camera.

Next, the method can include a step 404 of determining from the image, when the location of the scale is located is empty. This can also include determining if an object is present and instructing a user to remove any objects. An example method for determining when the location of the scale is located is empty is in FIG. 6.

If the bed is determined to be empty, the method can include a step 406 of determining a weight value output by the scale, along with a step 408 of determining an offset for the scale when the weight value is greater than a weight threshold. In the examples above, the weight threshold could be five pounds, but any value can be selected for the weight threshold. In some instances, the offset is obtained when the scale value is non-zero (e.g., offset is accepted regardless of thresholding).

The method can include a step 410 of adjusting the scale using the offset to zero the scale. For example, the offset could be applied when an object is loaded into the bed of the truck. The value output by the scale is adjusted using the offset value.

Figure 5:
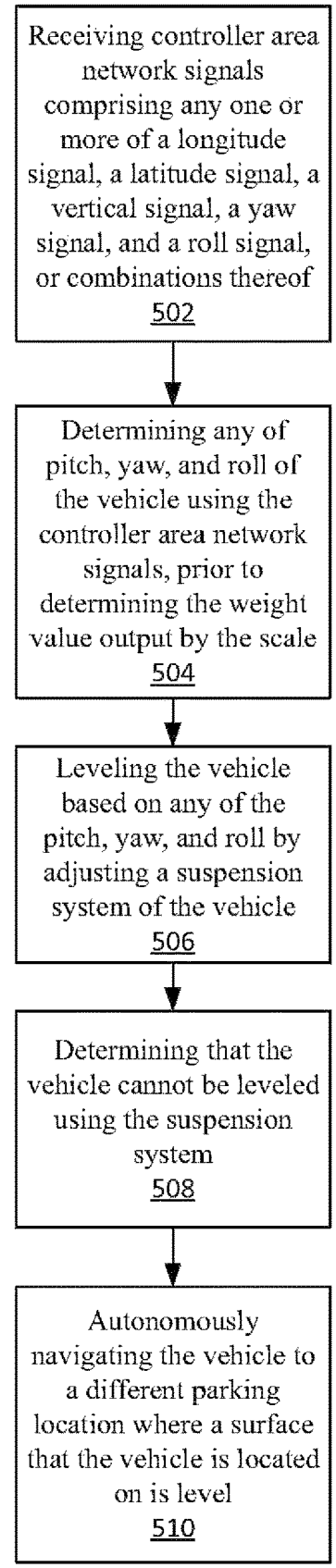
FIG. 5 is a flowchart of another example method related to determining when the vehicle is level.

FIG. 5 is a flowchart of another example method related to determining when the vehicle is level. The method can include as step 502 of receiving controller area network signals comprising any one or more of a longitude signal, a latitude signal, a vertical signal, a yaw signal, and a roll signal, or combinations thereof. Next, the method can include a step 504 of determining any of pitch, yaw, and roll of the vehicle using the controller area network signals, prior to determining the weight value output by the scale. In step 506, the method includes leveling the vehicle based on any of the pitch, yaw, and roll by adjusting a suspension system of the vehicle.

In some instances, the method includes a step 508 determining that the vehicle cannot be leveled using the suspension system. That is, after adjustments to the suspension system have been attempted, but the vehicle is still not level, a controller can determine that the vehicle cannot be leveled. In response, the method can include a step 510 of autonomously navigating the vehicle to a different parking location where a surface that the vehicle is located on is level. The level analysis process can be executed again until leveling has been achieved.

Figure 6:
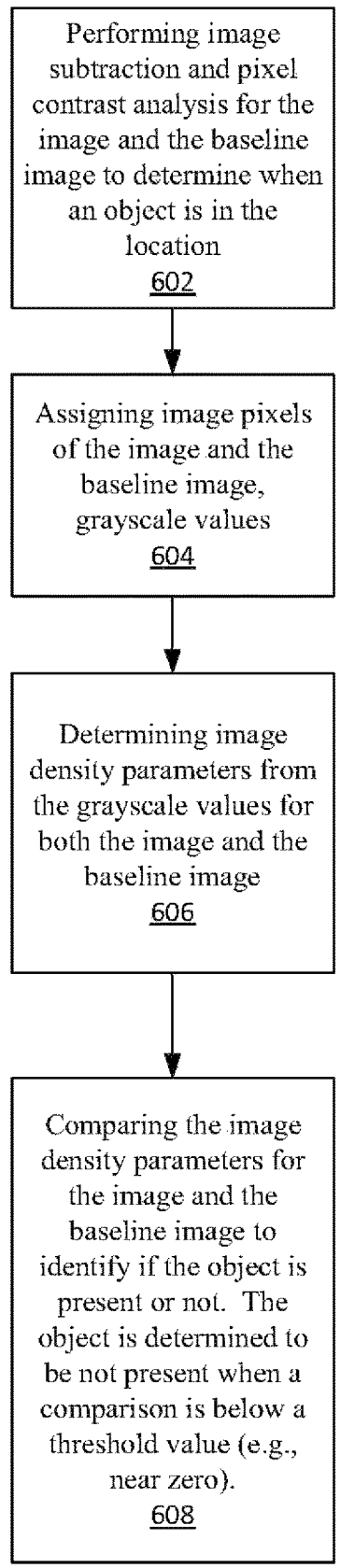
FIG. 6 is a flowchart of an example method for determining when the location of the scale is located is empty.

FIG. 6 is a flowchart of a method for imaging processing to determine if a bed of the truck is empty using image comparison. The method can include a step 602 of performing image subtraction and pixel contrast analysis for the image and the baseline image to determine when an object is in the location. Next, the method can include a step 604 of assigning image pixels of the image and the baseline image, grayscale values, as well as a step 606 of determining image density parameters from the grayscale values for both the image and the baseline image. The method can also include a step 608 of comparing the image density parameters for the image and the baseline image to identify if the object is present or not. The object is determined to be not present when a comparison is below a threshold value (e.g., near zero).

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically/physically connected. The terms "couple" and "coupling" are also used in a non-mechanical/physical context that refers to absorption of microwave energy by a material. It is further noted that various figures (including component diagrams) shown and discussed herein are for illustrative purpose only, and are not drawn to scale. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
    obtaining, via a camera of a vehicle, a first image of a location associated with a scale in the vehicle, the scale being used for cargo weight measurement;
    determining, from the first image, that the location is loaded with an object;
    causing, based at least in part on the first image, a human machine interface of the vehicle to display a message to clear the location of any objects;
    obtaining, via the camera, a second image of the location associated with the scale;
    determining, from the second image, that the location associated with the scale is empty;
    receiving controller area network signals comprising any one or more of a longitude signal, a latitude signal, a vertical signal, a yaw signal, and a roll signal, or combinations thereof;
    determining any of pitch, yaw, and roll of the vehicle using the controller area network signals;
    leveling the vehicle based on any of the pitch, yaw, and roll by adjusting a suspension system of the vehicle;
    determining, after leveling the vehicle, that a weight value output by the scale is greater than a weight threshold;
    determining an offset for the scale; and
    adjusting the scale using the offset to zero the scale.

2. The method according to claim 1, further comprising verifying a surface type of a surface that the vehicle is located on using global positioning system signals.

3. The method according to claim 1, wherein determining, from the second image, that the location associated with the scale is empty includes comparing the second image to a baseline image of the location.

4. The method according to claim 3, wherein determining, from the first image, that the location is loaded with the object comprises performing image subtraction and pixel contrast analysis for the first image and the baseline image.

5. The method according to claim 4, wherein determining, from the first image, that the location is loaded with the object further comprises:
    assigning image pixels of the first image and the baseline image respective grayscale values; and
    determining image density parameters from the grayscale values for both the first image and the baseline image.

6. The method according to claim 5, wherein determining, from the first image, that the location is loaded with the object further comprises comparing the image density parameters for the first image and the baseline image, wherein the object is determined to be not present when a comparison is below a threshold value.

7. The method according to claim 1, further comprising determining that the vehicle is in a key-off position before determining the weight value output by the scale.

8. A vehicle comprising:
    a scale used for cargo weight measurement;
    a camera;
    a human machine interface; and
    a controller having a processor and memory, the processor executing instructions stored in the memory to:
        obtain, via the camera, a first image of a location associated with the scale in the vehicle;
        determine, from the first image, that the location is loaded with an object;
        cause, based at least in part on the first image, the human machine interface to display a message to clear the location of any objects;
        obtain, via the camera, a second image of the location associated with the scale;
        determine, from the second image, that the location associated with the scale is empty;
        receive controller area network signals comprising any one or more of a longitude signal, a latitude signal, a vertical signal, a yaw signal, and a roll signal, or combinations thereof;
        determine any of pitch, yaw, and roll of the vehicle using the controller area network signals;
        cause a suspension system of the vehicle to level the vehicle based on any of the pitch, yaw, and roll by adjusting the suspension system;
        determine, after leveling the vehicle, that a weight value output by the scale is greater than a weight threshold;
        determine an offset for the scale; and
        adjust the scale using the offset to zero the scale.

9. The vehicle according to claim 8, wherein the processor is configured to:
 determine that the vehicle cannot be leveled using the suspension system; and
 autonomously navigate the vehicle to a different parking location where a surface that the vehicle is on is level.

10. The vehicle according to claim 8, wherein the processor is configured to determine, from the second image, that the location associated with the scale is empty by comparing the second image to a baseline image of the location.

11. The vehicle according to claim 10, wherein the processor is configured to:
 perform image subtraction and pixel contrast analysis for the first image and the baseline image to determine that the location is loaded with the object by:
  assigning image pixels of the first image and the baseline image respective grayscale values;
  determining image density parameters from the grayscale values for both the first image and the baseline image; and
  comparing the image density parameters for the first image and the baseline image, wherein the object is determined to be not present when a comparison is below a threshold value.

12. A device comprising:
 a processor; and
 a memory for storing instructions, the processor executing the instructions to:
  obtain, via a camera of a vehicle, a first image of a location associated with a scale in the vehicle, the scale being used for cargo weight measurement;
  determine, from the first image, that the location is loaded with an object by comparing the first image to a baseline image;
  cause, based at least in part on the first image, a human machine interface of the vehicle to display a message to clear the location of any objects;
  obtain, via the camera, a second image of the location associated with the scale;
  determine, from the second image, that the location of the scale is empty by comparing the second image to the baseline image;
  determine that the vehicle is in a key-off state;
  receive controller area network signals comprising any one or more of a longitude signal, a latitude signal, a vertical signal, a yaw signal, and a roll signal, or combinations thereof;
  determine any of pitch, yaw, and roll of the vehicle using the controller area network signals;
  level the vehicle based on any of the pitch, yaw, and roll by adjusting a suspension system of the vehicle;
  determine, after leveling the vehicle, that a weight value output by the scale is greater than a weight threshold;
  determine an offset for the scale; and
  adjust the scale using the offset to zero the scale.

13. The device according to claim 12, wherein the processor is further configured to verify a surface type of a surface that the vehicle is located on using global positioning system signals.

14. The device according to claim 12, wherein the processor is further configured to:
 determine that the vehicle cannot be leveled using the suspension system; and
 autonomously navigate the vehicle to a different parking location where a surface the vehicle is on is level.

* * * * *